United States Patent [19]

Pastor et al.

[11] 4,113,792
[45] Sep. 12, 1978

[54] PRESSURE SENSITIVE ADHESIVE COMPOSITIONS

[75] Inventors: Stephen D. Pastor, Edison; Martin M. Grover, Upper Montclair, both of N.J.

[73] Assignee: National Starch and Chemical Corporation, Bridgewater, N.J.

[21] Appl. No.: 808,101

[22] Filed: Jun. 20, 1977

[51] Int. Cl.$^2$ .................... C08L 63/10; C08L 23/34; C08L 67/06; C08F 255/02
[52] U.S. Cl. ................................. 260/834; 260/851; 260/854; 260/859 R; 260/862; 260/878 R
[58] Field of Search ........... 260/834, 851, 854, 859 R, 260/862, 878 R

[56] References Cited

U.S. PATENT DOCUMENTS

| | | | |
|---|---|---|---|
| 2,953,475 | 9/1960 | Bergstedt et al. | 260/851 |
| 2,978,433 | 4/1961 | Hurwitz | 260/851 |
| 3,317,631 | 5/1967 | Rees | 260/854 |
| 3,532,655 | 10/1970 | Radlove et al. | 260/854 |
| 3,919,153 | 11/1975 | Fischer | 260/851 |
| 3,962,372 | 6/1976 | Arhart | 260/878 R |

*Primary Examiner*—Alan Holler
*Attorney, Agent, or Firm*—Edwin Szala; Ellen T. Dec

[57] ABSTRACT

Pressure sensitive adhesive compositions are prepared from a mixture of an acrylic pressure sensitive polymer, a chlorosulphonated polyethylene and a polymerizable vinyl compound. The compositions are cured to form a strong bond upon contact with a condensation reaction product of a primary or secondary amine and an aldehyde.

21 Claims, No Drawings

PRESSURE SENSITIVE ADHESIVE COMPOSITIONS

BACKGROUND OF THE INVENTION

I. Field of the Invention

The present invention relates to improved pressure sensitive adhesives characterized by superior cohesive strength, aggressive tack, load bearing ability, heat resistance and resistance to solvents. More particularly, the present invention is directed to pressure sensitive adhesive compositions comprising a mixture of an acrylic pressure sensitive polymer, a chlorosulfonated polyethylene and a polymerizable vinyl compound. The compositions are cured to form a strong bond upon contact with a condensation reaction product of a primary or secondary amine and an aldehyde.

II. Brief Description of the Prior Art

Pressure sensitive adhesives, particularly acrylate-based pressure sensitive adhesives, are used for a wide variety of sealing, holding, fastening, mending and masking purposes due to their ability to form a bond at room temperature immediately upon contact, merely by the application of light pressure.

The major disadvantage to the use of the pressure sensitive adhesives is that, by their chemical nature, they have inherently low cohesive strength. In addition, they are thermoplastic and soften rapidly at temperatures in excess of about 140° F.; hence they are limited to applications where the stress on the bond or assembled joint is low (i.e., generally less than 2 psi in shear) and where temperature exposure not much in excess of room temperature is expected under this stress. In addition, pressure sensitive adhesives generally soften and cannot be used where exposure to commonly encountered organic fluids, such as gasoline, lubricating oils, transformer oils and industrial cleaning compounds is expected.

Various attempts have been undertaken to improve these inherent weaknesses of pressure sensitive adhesives, thus permitting expanded use thereof. As an example, the adhesive may be vulcanized or crosslinked during preparation of the pressure sensitive coated article such as described in U.S. Pat. Nos. 2,410,053, 2,973,286 and 3,707,518. These treatments can offer only small improvement in strength if they are to avoid damaging the aggressive tack required of a pressure sensitive adhesive. Additionally, these treatments often require an extended drying cycle in terms of time and energy required as well as at temperatures which may distort or embrittle the articles being coated. In other instances, the inherent weaknesses of pressure sensitive adhesives have been overcome by crosslinking the adhesive once the pressure sensitive article has been bonded (i.e., the final assembly has been made). Examples of such procedures are described in U.S. Pat. Nos. 3,118,534 and 3,307,690. In all cases, such procedures generally involve cure temperatures in excess of 100° C. for periods of time varying from 30 minutes to several hours. Often such cures are not feasible due to the size of the assembled part or the elevated temperature sensitivity of various components of the assembly.

It is therefore an object of the present invention to provide a pressure sensitive adhesive composition which has aggressive tack for convenient application at room temperature.

It is a further object of the invention to provide an adhesive composition which cures or crosslinks subsequent to final assembly, the crosslinking being affected quickly and at room temperature in a manner such that the load bearing ability, heat resistance and resistance to various organic fluids is improved.

SUMMARY OF THE INVENTION

The novel improved pressure sensitive adhesives are particularly characterized by both aggressive tack and cohesive strength and comprise from 50–85% by weight of an acrylate-based pressure sensitive adhesive polymer, 4–24% of a chlorosulfonated polyethylene and 11–40% of a polymerizable vinyl monomer or unsaturated oligomer or mixtures thereof. These compositions are cured by contact with an initiator comprising the condensation reaction product of an aldehyde and a primary or secondary amine.

Thus in accordance with the present invention, it has been found that the addition of a chlorosulfonated polyethylene and polymerizable vinyl monomer or unsaturated oligomer to conventional acrylic polymeric pressure sensitive adhesives will result, upon curing, in a dramatic improvement in cohesive strength as well as heat and solvent resistance without loss of aggressive tack prior to cure.

In addition to the required components, the adhesive composition of the invention may optionally include free radical generators, free radical stabilizers, chelating agents, etc., useful in particular applications as will be described in detail hereinbelow.

DETAILED DESCRIPTION OF THE PREFERRED EMBODIMENTS

The pressure sensitive adhesive polymers used as the major component in the compositions of the present invention include all the conventionally employed acrylate-based pressure sensitive adhesives. These acrylate-based pressure sensitive adhesives are well-known in the art and include those polymers prepared from acrylic acid esters of alcohols having up to about 18 carbon atoms. The preferred alkyl acrylates have an average of from about 4 to about 10 carbon atoms in the alkyl groups, and include n-butyl acrylate, amyl acrylate, hexyl acrylate, heptyl acrylate, octyl acrylate, nonyl acrylate, decyl acrylate and various isomers of these acrylates such as isooctyl acrylate or 2-ethylhexyl acrylate. Higher alkyl acrylates can in some instances be used, particularly in combination with the lower alkyl acrylates whereby the average number of carbon atoms in the alkyl groups is within the desired range.

In most cases it is necessary to have at least about 30% by weight of the acrylic polymer prepared from alkyl acrylates having an average of from about 4 to about 10 carbon atoms in the alkyl group and, in many preferred polymeric compositions, 60% or more are made up of these monomers.

The acrylate-based polymer preferably contains up to about 15% by weight of an acrylic monomer containing one or more reactive hydrogen atoms (e.g., OH or COOH) such as hydroxyalkyl esters of ethylenically unsaturated carboxylic acids, ethylenically unsaturated carboxylic acids, or mono-functioned anhydrides thereof and amines formed, for example, by the reaction of propylene imine and a carboxyl-containing polymer. The location of the reactive hydrogen atom is not critical but it is preferred that the hydrogen atom be connected to a hetero atom such as O, N or S. The preferred acrylic monomers containing a reactive hydrogen atom are the ethylenically unsaturated carboxylic acids or anhydrides, including acrylic acid methacrylic acid, and maleic anhydride but other copolymerizable acids such as crotonic acid, itaconic acid and fumaric acid can also be employed. There can also be utilized half esters of unsaturated dicarboxylic acids such as methyl fumarate mono-ester, butyl fumarate mono-ester, ethyl maleate mono-ester and butyl maleate mono-ester. Preferred hydroxy alkyl esters of ethylenically unsaturated acids include esters of acrylic acid, methacrylic acid and other alpha-beta ethylenically unsaturated carboxylic acids. Examples include 2-hydroxyethyl acrylate, 2-hydroxypropyl acrylate, 3-hydroxpropyl acrylate, 2-hydroxyethyl methacrylate, 2-hydroxypropyl methacrylate, 3-hydroxypropyl methacrylate, 4-hydroxybutyl methacrylate and corresponding esters of other unsaturated acids such as ethacrylic acid, crotonic acid and similar acids of up to about 6 carbon atoms. There may also be employed mono or di-esters of unsaturated dicarboxylic acids such as maleic acid, fumaric acids, and itaconic acid in which at least one of the esterifying groups contains a hydroxyl group. Examples of such esters include mono (2-hydroxyethyl) maleate, mono (2-hydroxyethyl) fumarate, bis (2-hydroxyethyl) maleate, mono (2-hydroxypropyl) maleate, bis (2-hydroxypropyl) maleate, mono (2-hydroxyethyl) itaconate, bis (2-hydroxyethyl) itaconate and 2-hydroxyethylbutyl maleate. Such optional comonomers are preferably present in amounts of about 0.3 to about 10% by weight of the total acrylate polymer.

There can also be included in the acrylic polymer up to about 70% by weight of one or more other additional copolymerizable monomers which contain an ethylenically unsaturated linkage, such linkage being the only reactive functional group in the monomer. The term "reactive functional groups" herein refers to crosslinking functional groups such as hydroxyl, carboxyl, etc. For example, there is often included a vinyl ester of a saturated carboxylic acid such as vinyl acetate, vinyl propionate or vinyl butyrate. Other optional monomers which will copolymerize by addition reaction that can be employed include alkyl acrylates other than those above and alkyl methacrylates having from 1 to 20 carbon atoms or more in the alkyl group, such as methyl methacrylate, butyl methacrylate, octadecyl methacrylate, lauryl methacrylate and the like. Typical acrylate-based pressure sensitive adhesives are described in U.S. Pat. Nos. 3,535,295 and 3,769,254.

It will be recognized that the combination of monomers used to make up the acrylic polymer will be such as to provide a normally tacky pressure-sensitive material. Thus, within the skill of the art, the polymer can include essentially any ethylenic monomer or mixture of monomers copolymerizable with the other components which do not, in combination with those components, provide unsatisfactory properties such as unsatisfactorily reduced tack. Such other monomers can be of widely varying types, depending upon the specific alkyl acrylates, hydroxyalkyl esters, carboxylic acids and other monomers in the interpolymer. For instance, there can be utilized in certain cases monoolefinic hydrocarbons, such as styrene and vinyl toluene; halogenated monoolefinic hydrocarbons, such as vinyl chloride and vinylidene chloride; unsaturated esters, such as isopropenyl acetate and dimethyl maleate; and dienes, such as 1,3-butadiene.

As indicated above, the acrylic polymers herein are normally tacky and the composition of the polymer is chosen in accordance with known practice so as to provide a product of suitable tack. However, it is also within the scope of the present invention to include acrylate-based polymers which do not initially exhibit commercially acceptable pressure sensitive properties but which, upon the inclusion of the polymerizable monomer or oligomer (to be discussed hereinbelow) and/or tackifier will result in a system displaying sufficient tack to be considered pressure sensitive. Tack is normally inversely related to the plasticity of the polymer, which is a measure of the deformability of the polymer under an applied load. The polymers herein will generally have a Williams plasticity number below about 3.5 mm, although where the plasticity is above this level, some added tackifiers may be provided to produce the desired properties.

The preferred pressure sensitive adhesive polymer bases used in the present invention include the interpolymers of 2-ethylhexyl, octyl or butyl acrylate, vinyl acetate and acrylic acid wherein the acrylate ester constitutes not less than 60% of the polymer polymerized to a relatively high molecular weight with conventional free radical initiators and characterized by a Williams plasticity number of 2.1 to 3 mm.

The chlorosulfonated polyethylene components employed herein contain from about 25 to 70 weight percent chlorine and about 3 to 160 millimoles sulfonyl chloride moiety per 100 grams of polymer and the polyethylene from which the polymer is prepared should have a melt index of about 4–500. Suitable chlorosulfonated polyethylene polymers can be prepared in a manner well known to those skilled in the art by reaction of linear or branched polyethylene and sulfonyl chloride or sulfur dioxide and chlorine. Chlorosulfonated polyethylene is also available commerically, for example, from E. I. duPont de Nemours & Co. under the tradename "Hypalon." In practice the chlorosulfonated polyethylene may also be a chlorosulfonated copolymer of ethylene with small proportions of propylene or other olefins. Alternatively, sulfonyl chloride and chlorinated polyethylenes of suitable molecular weight can be used. The sulfonyl chlorides can be mono- or polyfunctional and can be $C_1$–$C_{12}$ alkyl sulfonyl chlorides, $C_6$–$C_{24}$ aromatic sulfonyl chlorides such as benzene or toluene sulfonyl chloride. Some sulfonyl chlorides containing hetero atoms have also been found to work, such as diphenylether — 4,4'-disulfonyl chloride. For convenience our use of ther term "chlorosulfonated polyethylene" shall be understood to designate any of the above materials.

Various chlorosulfonated polyethylenes and methods of their preparation are discussed, as for example, in U.S. Pat. No. 2,982,759, the disclosure of which is incorporated herein by reference. The use of these polymers in conjunction with certain other polymers and curing agents therefor have also been described in the art. Thus, U.S. Pat. No. 2,968,677 teaches that chlorosulfonated polyethylene and specific elastomeric materials, e.g., natural rubber, copolymers of butadiene-styrene, isobutylene-isoprene, butadiene-acrylonitrile, or polychloroprene, could be combined in the presence of polyvalent metal oxide and cured using conventional rubber vulcanization technology.

As a third component of the pressure sensitive adhesives of the present invention there is required at least one low molecular weight vinyl monomer or unsaturated oligomer.

Suitable low molecular weight vinyl monomers include (i) acrylic and methacrylic acids; (ii) the hydroxyalkyl esters of said acids, wherein the alkyl chains contain from 2 to 20 carbon atoms, e.g., 2-hydroxyethyl acrylate, hydroxypropyl acrylate, hydroxybutyl acrylate, hydroxypentyl acrylate, hydroxyhexyl acrylate, hydroxyheptyl acrylate, hydroxyoctyl acrylate, etc., and the corresponding hydroxyalkyl methacrylates; (iii) the glycidyl esters of said acids; (iv) the ethylene glycol and polyethylene glycol diesters of said acids, e.g., ethylene glycol diacrylate, diethylene glycol diacrylate, triethylene glycol diacrylate, tetraethylene glycol diacrylate, etc., and the corresponding ethylene glycol dimethacrylate and polyethylene glycol methacrylates; (v) the polyhydric alcohol esters of said acids, e.g., the pentaerythritol tri- and tetraacrylates and the corresponding methacrylates; (vi) the non-gem alkanediol esters of said acids, e.g., 1,6-hexanediol diacrylate, 1,4-butylene glycol diacrylate; (vii) the alkyl and alkyl substituted alkyl acrylates and methacrylates, wherein the alkyl groups contain from 2 to 20 carbon atoms, e.g., ethyl acrylate, ethyl methacrylate, propyl acrylate, propyl methacrylate, 2-ethylhexyl acrylate, etc., (viii) the cycloalkyl esters of said acids, wherein the cycloalkyl groups contain from 5 to 14 carbon atoms, e.g., cyclohexyl acrylate or cyclohexyl methacrylate; and (ix) trimethylolpropane triacrylate and corresponding methacrylate.

Polymerizable unsaturated oligomers include (1) unsaturated polyurethanes (2) unsaturated epoxides (3) unsaturated polyesters, and (4) vinyl terminated elastomers. The preparation of such unsaturated oligomers is familiar to those skilled in the art. An unsaturated polyurethane may be prepared, for example, by reacting a hydroxyl terminated polyester or polyether with toluene diisocyanate and hydroxyethyl acrylate in the presence of an organotin catalyst. Generally, the unsaturated epoxides employed will be a reaction product of acrylic or methacrylic acid with a polyfunctional epoxy compound containing at least two epoxy groups per molecule and having a molecular weight from about 200 to about 1,500. Commercially available epoxy compounds include Union Carbide's ERL-2795, Shell Chemical's Epon series of resins (e.g., Epon 812, 815, 820, 828 and 830) as well as the epoxy novalac resins sold by Dow Chemical under the DEN designation. Virtually any unsaturated polyester compositions can be employed with the trifunctional hydroxyl terminated polyester supplied by Hooker Chemical as Rucoflex F-1017-18 esterified with acrylic acid and the bisphenol A — fumarate polyester supplied by ICI as the Atlac series being considered representative. Suitable vinyl terminated elastomers are represented by the vinyl terminated butadiene Hycar products supplied by B. F. Goodrich.

As an optional component there may also be present in the adhesive base composition a copolymerizable alpha, beta-unsaturated carboxylic acid, a half-ester of a cyclic anhydride or a half-ester of a cyclic anhydride with hydroxyalkyl esters of alpha, beta-unsaturated carboxylic acids. Exemplary optional components include methacrylic acid, acrylic acid, crotonic acid, fumaric acid, itaconic acid, ethyl maleate mono-ester, n-butyl maleate mono-ester, i-propyl maleate mono-ester, 2-acryloxyethyl phthalate mono-ester, acryloxypropyl phthalate mono-ester, methacryloxyethyl phthalate mono-ester, 2-acryloxyethyl succinate mono-ester, 2-acryloxyethyl methylsuccinate mono-ester, 2-acryloxyethyl chlorendate mono-ester etc. This optional component is generally present in amounts of up to 10% by weight preferably 4 to 6% of the adhesive based composition.

Particularly preferred adhesive base compositions are those prepared using, in addition to the acrylic polymer and chlorosulfonated polyethylene (a) at least one low molecular weight multifunctional vinyl monomer including the alkane diol esters of acrylic and methacrylic acid, the ethylene and polyethylene glycol esters, the pentaerythritol esters and the trimethylolpropane esters of acrylic and methacrylic acids; (b) at least one unsaturated oligomer as described above; and (c) at least one copolymerizable carboxylic acid as described above. When these three components are employed, the vinyl monomer and oligomer will generally be present in approximately the same concentrations, with the carboxylic acid component present in amounts of about 10% by weight of the adhesive base composition. The use of such multicomponent adhesive base compositions allows the practitioner to obtain a superior degree of structural characteristics (crosslink density), flexibility and adhesion for particular end uses.

In general, the pressure sensitive acrylic polymer will be employed in amounts of about 50–85%, preferably 55–70%, by weight of the final improved adhesive composition; the chlorosulfonated polyethylene in an amount of 4–24%, preferably 8–15%, by weight and the low molecular weight polymerizible monomer and/or unsaturated oligomer in an amount of 11–40%, preferably 22–35%, by weight.

The curing of the chlorosulfonated polyethylene and vinyl monomeric or oligomeric compounds is described in U.S. Pat. No. 3,890,407. In accordance with the present invention, it is required that the condensation reaction product of a primary or secondary amine and an aldehyde be employed as an initiator in the curing of the adhesive. Typical aldehydes employed in the preparation of these initiators include acetaldehydes, butyraldehyde, propionaldehyde, and hydrocinnamaldehydes. Preferred are the primary amines such as ethyl amine, hexyl amine, aniline, butyl amine and tolyl amines. Particularly preferred initiators are the butyraldehyde — aniline and butyraldehyde-butyl amine condensation products sold by E. I. duPont deNemours & Co. under the tradenames "Accelerator 808" and "Accelerator 833," respectively. Several other useful initiators are discussed in U.S. Pat. No. 3,591,438, the disclosure of which is incorporated herein by reference.

In addition to the initiator required for the curing of the adhesives of the invention, various optional ingredients may also be present to facilitate curing. Among such components are included polymerization catalysts which are not active at room temperature in the absence of an initiator. Such catalysts include accelerators such as the oxidizable transition metals and/or free radical generators such as the organic peroxides and hydroperoxides (e.g., dibenzoyl peroxide, t-butyl hydroperoxide and cumene hydroperoxide) in the amounts of 0.05 to 2.5%, preferably 0.1 to 1%, by weight of the composition. Additionally, fillers, tackifiers, stabilizers, and similar additives which do not detrimentally affect the basic properties of the adhesive may also be present.

It is also desirable to include in the adhesive composition a chelated metal which will function to increase the plasticity number of the uncured film to the range of about 2 to 3, thereby providing improved pressure sensitive properties prior to curing. The chelated metals used are generally polyvalent metal cations coordinated with volatile ligands which do not inhibit free radical polymerization. Ligands found to be especially useful in this invention include beta-diketones such as 2,4-pentanedione, 2,4-hexanedione, etc., as well as the beta-ketoesters such as ethylacetoacetate. The practitioner may choose from a variety of available polyvalent metal ions, provided the metal does not enter into oxidation-reduction reactions with the final pressure sensitive crosslinking composition thereby initiating premature cure. Chelated metals found useful in this invention include among others, the chelated metal alkoxides described in U.S. Pat. No. 3,769,254. Particularly preferred compounds include aluminum di-isopropoxide acetoacetic ester chelate, aluminum triacetylacetonate, aluminum disecondary butoxide acetoacetic ester chelate, zinc acetylacetonate, titanium diisopropoxide diacetylacetonate, etc. Such chelating agents are usually employed in amounts of 0.1 to 0.6%, preferably 0.2 to 0.4%, by weight.

Free radical stabilizers may also be added to the composition in order to improve storage life thereof by preventing premature polymerization. These stabilizers are well known by those skilled in the art and include hydroquinone, p-methoxyphenol, 2,6-di-t-butyl-4-methylphenol, etc.

In order to produce the improved pressure sensitive adhesives of the present invention, the acrylate-based pressure sensitive polymer, the chlorosulphonated polyethylene, the vinyl monomer and/or oligomer and any optional components (hereinafter referred to as the adhesive base component) are merely blended together in a suitable solvent. Suitable solvents are those known for use in pressure sensitive adhesive lacquers and include the chlorinated aliphatics, aromatics, ketones, esters and the like typically represented by toluene, methyl ethyl ketone, acetone, ethyl acetate, chloroform, etc. as well as compatible mixtures thereof. Although such organic solvents are preferred, the use of aqueous solvents is also contemplated herein. Furthermore, other diluents may also be present, e.g., aliphatics and alcohols such as ethyl alcohol, isopropyl alcohol, etc., as is known in the art. In the embodiment wherein chelated metals are employed, it is preferable that the solvent contains at least about 20% by weight of an alcohol and that as little water be present as possible since the water hydrolyzes and deactivates the chelating agent.

The adhesive component may be employed in various forms. For instance, the adhesive may be coated onto a backing member and dried to provide pressure-sensitive coated sheet materials, such as tapes, sheets, or panels. Cellophane, vinyls, cloth, polyester film, rubber, various laminates and other such flexible materials, as well as wood, metal, hardboard, and other less flexible backings, can be coated in this manner. In some cases, the adhesive can be used as a dispersion or in solution as a liquid ahdesive and applied just prior to use. In the case of tape, the coated, dried product is generally self-wound in roll form. As an alternate to coating the part or substrate directly, the adhesive is often coated onto a release liner and transferred to the part after the adhesive has been dried. Often the release liner is coated on both sides with an abherent material, such as a silicone polymer, so it may be self wound after the adhesive has dried. In this instance, the adhesive in film form may be transferred to the part or substrate at some later time.

The amine-aldehyde initiator component of the adhesive composition may be applied alone, in a solvent, (e.g., dichlorodifluoromethane, dichloromethane, monochlorodifluoromethane) or may be blended with 1–50% by weight of a high molecular weight polymer or with comparable amounts of a conventional pressure sensitive adhesive. In accordance with the latter embodiment, the pressure sensitive adhesive provides good initial contact and cohesive strength thereby preventing flow of the initiator on the surface during coating and facilitating application of the primer without seriously retarding the crosslinking rate of the adhesive. The initiator itself, or in any of the diluted forms described above, may be applied by brushing, spraying, or the like, upon at least one surface to be bonded and any solvent present allowed to evaporate leaving a deposit of primer on the surface. The initiator may be applied in such manner to one or both surfaces or substrates prior to bonding. Alternatively, but not preferably, the initiator may be mixed with the adhesives base component (i.e. the acrylate polymer, chlorosulphonated polyethylene and vinyl monomer or oligomer) immediately prior to coating or the initiator may be applied to at least one of the substrates which has been previously coated with the adhesive base component.

The amount of initiator to be applied to a given surface should be no more than necessary to obtain efficient acceleration of the bonding operation. Excess initiator on one or more of the bonded surfaces can adversely affect the strength of the final bond. Further, when the amount of bonding initiator exceeds about 15% by weight of the adhesive, little if any additional increase in speed is noted. Generally, an amount of bonding initiator of from about 0.01 to about 3.0 percent by weight of the adhesive base component is adequate.

The pressure sensitive adhesives of the present invention may be used to bond virtually any substrates including steel, aluminum, copper, brass, plastics (i.e., polyesters, polyamides, polyurethanes, polyvinyl chloride), wood, prepainted surfaces, glass and paper. In some instances, as in the case of bonding polyolefins, surface treatment (e.g., corona discharge) may be required to aid in promoting adhesion.

In the examples the following testing procedures are employed to measure the comparative properties of the various adhesives.

WILLIAMS PLASTICITY (ASTM METHOD D-926)

In determining Williams plasticity values, a film having a dry thickness of 4 to 5 mils. of the polymer being evaluated is cast onto a conventional release sheet. The dry film is peeled from the release sheet and molded into a solid cylindrical slug approximately 1.5 cm. wide, 2 cm. long and weighing exactly 1.8 gms. The slug is then conditioned for 15 minutes at a temperature of 38° C. whereupon it is inserted between the two paralleled platens of the plastometer which have also been maintained at a temperature of 38° C. The upper platen, which is weighted with 5 kg. and is attached to a micrometer which serves to measure the height of the slug after compression, is lowered onto the slug and maintained in that position for 15 minutes. The resulting micrometer readings, in millimeters, indicate the resistance to plastic flow on the part of the polymer samples being evaluated. High plasticity values are indicative of greater resistance to flow, and thus, denote a firmer polymer whereas low plasticity values are indicative of less resistance to flow, and thus, denote a softer polymer.

180° PEEL ADHESION TEST (ASTM METHOD D-1000)

This test consists of measuring the force necessary to strip or delaminate the 4–5 mils. adhesive film test sample (1 × 6 inch × 1.5 mils) coated on 4 mil aluminum from 64 mil etched aluminum at a rate of pull, or withdrawal, of 12 inches per minute. An Instron Tensile Tester was used to provide the pulling force. Thus, the force necessary to effect delamination is recorded as the "180° Peel Adhesion" value. Tests were taken after 3 days at room temperature and also after 3 days at elevated temperatures as noted in the examples. Values are shown in lbs. per linear in with the higher values indicating the best results.

SHEAR ADHESION TEST (4 PSI HOLD)

The shear strength is measured by transferring the adhesive onto a 2-mil thick polyethylene terephthalate at a sample thickness of 5 mils. The coated sample is then applied to a steel panel with a 0.5 inch overlap joint. A 1-pound weight was suspended from the sample with the primed steel panel maintained vertically and the time until separation occurs is measured. The test is carried out in an oven at 150° C. The test is a measure of the structural cohesive strength and ability to maintain cohesive strength over a period of time. Thus, the adhesives showing the longest times are preferred.

EXAMPLE 1

A pressure sensitive adhesive polymer comprising 70% by weight of 2-ethylhexyl acrylate, 24% vinyl acetate and 6% acrylic acid is prepared by conventional free radical polymerization procedures. The polymer is characterized by a Williams Plasticity number of 2.0–2.5 mm. and has a solids content of 35% in ethyl acetate.

Seventy-eight parts (anhydrous weight) of the adhesive polymer were then combined with 10.6 parts Hypalon 30 (parts are on an anhydrous basis — Hypalon provided as a 50% solids solution in ethyl acetate), 9.1 parts trimethylolpropane triacrylate and 2.3 parts α,α-dimethylbenzyl hydroperoxide.

A 5 mil dry film of the resultant composition on release paper was transfer coated to 2 mil thick polyester film. An adhesive bond was made to stainless steel primed with an aniline-butyraldehyde condensation product (duPont Accelerator 808) as initiator. A 4 psi hold test (Shear Adhesion test) was run on the sample and the film found to display more than 2 hour holding power at 150° C. thus showing increased high temperature performance over a 5 mil film of the starting pressure sensitive adhesive polymer which had not been treated in accordance with the present invention and which exhibited only a 3 min. hold at those elevated temperatures.

EXAMPLE 2–27

In the following examples, the procedure of Example I was repeated using the same starting pressure sensitive polymer. In the examples shown in Table I, different monomer and monomer blends and various ratios of chlorosulfonated polyethylene are shown as are the use of various free radical generators, stabilizers and/or metal chelates.

Four psi hold tests performed on each of the samples gave results in excess of 2 hours at 150° C.

EXAMPLE 28

This example illustrates the use of an unsaturated urethane in the crosslinking pressure sensitive adhesives of this invention. The unsaturated polyurethane was prepared in the following manner. A 3 liter flask equipped with mechanical agitation, thermometer, and water bath was charged with 600 grams of poly (ethylene oxide) (OH #187), 500.6 grams of methylene-di-p-phenyl di-isocyanate, 232.2 grams of hydroxyethyl acrylate, 8 grams of dibutyltin dilaurate, and 1.6 grams of 2,6 di-t-butyl-5-methylphenol. The contents of the flask were agitated and slowly heated to 70° C. The contents were held at 70° C. until percent residual NCO was essentially zero as determined by titration with dibutylamine.

TABLE I

| Example No. | Pressure Sensitive Polymer of Ex. 1 | Hypalon 30 | Trimethylolpropane Triacrylate | 1,6-Hexanediol Diacrylate | Tetraethylene glycol Diacrylate | 2-hydroxypropyl Acrylate | Ethylhexyl-Trimethylolpropane Trimethacrylate | (3-Methacryloxy-2-hydroxypropyl) Phosphate | Methacrylic Acid | 2,4-Pentanedione | iso-Propyl Alcohol | Aluminum α,α-dimethylbenzyl Hydroperoxide | Aluminum diisopropoxide Acetoacetic Ester Chelate | 2,6-Di-t-butyl-4-methylphenol | 180° Peel Adhesion Test (pli) |
|---|---|---|---|---|---|---|---|---|---|---|---|---|---|---|---|
| 2 | 63 | 10 | 20 | | | | | | 5 | | | | | | 5-7 |
| 3 | 53 | 10 | 30 | | | | | | 5 | | | | | | 5 |
| 4 | 53 | 10 | 35 | | | | | | | | | | | | 4-5 |
| 5 | 45 | 10 | 40 | | | | | | | | | | | | 9-10 |
| 6 | 55 | 10 | 30 | | | | | | 5 | | | 0.25 | | 4-5 | 9-10 |
| 7 | 55 | 10 | 30 | | | | | | 5 | | | 0.5 | | | 9-10 |
| 8 | 54 | 20 | 20 | | | | | | 5 | | | 1.0 | | | 9-10 |
| 9 | 55 | 10 | 30 | | | | | | 5 | 1.2 | 9.3 | 1 | 0.3 | 0.4 | 9-10 |
| 10 | 55 | 10 | 30 | | | | | | 5 | 1.2 | 9.3 | 1 | 0.3 | 0.4 | 12-14 |
| 11 | 55 | 10 | 15 | 15 | | | | | 5 | 1.2 | 9.3 | 1 | 0.3 | 0.4 | 16-18 |
| 12 | 55 | 10 | 15 | | 15 | | | | 5 | 1.2 | 9.3 | 1 | 0.1 | 0.4 | 14-18 |
| 13 | 55 | 10 | 15 | | | 15 | | | 5 | 1.2 | 9.3 | 0.5 | 0.2 | 0.4 | 9-10 |
| 14 | 55 | 10 | 15 | | | | 15 | | 5 | 1.2 | 9.3 | 1 | 0.35 | 0.4 | 1-3 |
| 15 | 55 | 10 | 15 | | | | | 15 | 5 | 1.2 | 9.3 | 1 | 0.4 | 0.4 | 17-18 |
| 16 | 60 | 10 | | 25 | | | | | 5 | 1.2 | 9.3 | 1 | 0.4 | 0.4 | 14-15 |
| 17 | 60 | 10 | | | 25 | | | | 5 | 1.2 | 9.3 | 1 | 0.3 | 0.4 | 9-10 |
| 18 | 55 | 10 | | 30 | | | | | 5 | 1.2 | 9.3 | 1 | 0.3 | 0.4 | 10-11 |
| 19 | 55 | 10 | 20 | | 30 | 10 | 30 | | 5 | 1.2 | 9.3 | 1 | 0.3 | 0.4 | 19 |
| 20 | 55 | 10 | 25 | | | | | | 5 | 1.2 | 9.3 | 1 | 0.3 | 0.4 | 11-13 |
| 21 | 55 | 10 | 28 | | | | | | 10 | 2.0 | 10 | 1 | 0.4 | 0.2 | 9-10 |
| 22 | 55 | 10 | 15 | 5 | 10 | | | | 7 | 1.2 | 9.3 | 1 | 0.3 | 0.4 | 9-10 |
| 23 | 55 | 10 | 10 | 10 | 5 | 5 | | | 5 | 1.2 | 9.3 | 1 | 0.4 | 0.4 | 11-12 |
| 24 | 55 | 10 | 35 | | | | | | 5 | | | | | | 12-13 |
| 25 | 55 | 10 | 20 | | | | | | 5 | | | | | | 7-9 |
| 26 | 55 | 5 | | | | | | | 5 | 1.2 | 9.3 | 3 | 0.4 | 0.4 | 7-9 |
| 27 | 51 | 24 | | | | | | | 5 | 1.2 | 9.3 | 1 | 0.4 | 0.4 | 10 |

The urethane is used to prepare the following composition:

Pressure sensitive polymer of Ex. 1: 55
Hypalon 30: 10
1,6-Hexanediol diacrylate: 15
Unsaturated polyurethane: 15
Methacrylic acid: 5
α,α-Dimethylbenzyl hydroperoxide; 1
i-Propyl alcohol: 9.3
2,4-Pentanedione: 1.2
Aluminum di-isopropoxide acetoacetic ester chelate: 0.3
2,6-Di-t-butyl-5-methylphenol 0.4

The adhesive was coated as in Example I, using an initiator consisting of the following:

Aniline: Butyraldehyde condensation product: 200
Pressure sensitive adhesive of Example I: 100
Copper (II) Naphthenate: 0.2

Four psi holds were done at 150° C. All samples were found to survive the test after 2 hours at 150° C. Cured samples gave 180° Peels in the 10–12 pli range.

EXAMPLE 29

This example illustrates the use of a low molecular weight carbamate monomer in the pressure sensitive curing adhesives of this invention. The carbamate monomer was prepared as follows. Into a 500 ml flask equipped with mechanical agitation, reflux condenser with drying tube, slow addition funnel, and water bath was charged 116.1 grams of hydroxyethyl acrylate, 100 ml of tetrahydrofuran (dried over molecular sieves), 1 gram of diacetoxy dibutyltin, and 0.2 grams 2,6-t-butyl-4-methylphenol. The contents of the flask were heated to 60° C. and 99.1 grams of butyl isocyanate added slowly, maintaining temperature between 60°–65° C. The flask contents held at 65° C. until residual NCO was essentially zero as determined by titration with dibutylamine. The tetrahydrofuran was removed upon completion of the reaction. The carbamate monomer was used to prepare a pressure sensitive curing film of the following composition:

Pressure sensitive polymer of Ex. 1: 55
Hypalon 30: 10
Trimethylolpropane triacrylate: 15
Carbamate monomer: 15
Methacrylic acid: 5
2,4-Pentanedione; 1.1
i-Propyl alcohol: 9.3
Aluminum di-isopropoxide acetoacetic ester chelate: 0.3
  α,α-Dimethylbenzyl hydroperoxide: 1.0
  2,6-Di-t-butyl-4-methylphenol: 0.4

The pressure sensitive crosslinking film was coated, cured and tested as in Example 28. Similar performance in regard to 4 psi hold and peel was obtained.

EXAMPLE 30

This example illustrates the use of an unsaturated polyester in the pressure sensitive curing films of this invention. Into a 3 liter flask equipped with mechanical agitation, reflux condenser topped with drying tube, thermometer, and water bath was charged 484 grams of a commercial trifunctional hydroxyl terminated polyester (OH #174-2, Hooker Chemical Rucoflex F-1017-18), 428.9 grams tetra chlorophthalic anhydride, 283 grams of 1,6-hexanediol diacrylate, 6.0 grams triethyl amine, and 1.2 grams 2,6-di-t-butyl-4-methylphenol. The reaction temperature was raised to 90°–95° C. until an acid number of 84 mg KOH/g polymer. 6.0 grams of benzyl triethyl ammonium chloride was then charged, and 213.3 grams of 2,3-epoxypropyl methacrylate was added over a 1 hour period. The reaction mixture was held until an acid number of 4.23 mg KOH/gram polymer, cooled, and discharged. The following crosslinking pressure sensitive film composition was prepared:

Pressure sensitive polymer of Example 1: 55
Hypalon 30: 10
Unsaturated polyester: 15
Trimethylolpropane triacrylate: 15
i-Propyl alcohol: 9.3
2,4-Pentanedione: 1.1
Methacrylic acid: 5
α,α-Dimethylbenzyl hydroperoxide: 1.0
2,6-di-t-butyl-4-methylphenol: 0.4
Aluminum di-isopropoxide acetoacetic ester chelate: 0.3

Samples were transfer coated and cured using the initiator blend of Example 29. 180° Peels of the crosslinked films of this example were 5 pli.

EXAMPLE 31

The unsaturated polyester of example 30 was further modified by the addition of 85.6 grams of methyl isocyanate and 6.0 grams diacetoxydibutyltin to provide carbamate functionality (urethane). The following pressure sensitive crosslinking film composition was formulated:

Pressure sensitive adhesive of Example 1: 55
Hypalon 30: 10
Unsaturated urethane: 15
1,6-Hexanediol diacrylate: 15
Methacrylic acid: 5
α,α-Dimethylbenzyl hydroperoxide: 1
i-Propyl alcohol; 9.3
2,4-Pentanedione: 1.1
2,6-di-t-butyl-4-methylphenol: 0.4
Aluminum di-isopropoxide acetoacetic ester chelate: 0.3

After coating, drying and curing, the crosslinked films of this composition display four psi holds over 1½ hours at 150° C. 180° Peel on etched aluminum to aluminum were 14–15 psi.

EXAMPLES 32–48

These examples further illustrate the use of the unsaturated oligomer of Example 31 and other commercially available unsaturated oligomers. In addition to the specific components employed and shown in Table II, all compositions included 5 parts methacrylic acid, 1.1 parts 2,4-pentanediol, 9,3 parts isopropyl alcohol, 1 part α,α-dimethylbenzyl hydroperoxide and 0.4 part 2,6-di-t-butyl-4-methylphenol.

TABLE II

| Ex. No | P.S. Polymer of Ex. 1 | Hypalon 30 | Urethane of Ex. 31 | Epoxy Acrylate (Shell Chem. Epocry 12) | Vinyl terminated Butadine Copolymer (Hycar-B.F. Goodrich) | Unsat. Urethane (castomer U 0100 Witco Chem Corp) | Unsat. Urethane Uvithane 783 Thiokol | Bisphenol A: Fumarate Polyester | Trimethylolpropane triacrylate | 1,6-Hexanediol Diacrylate | Tetraethyleneglycol Diacrylate | Hydroxypropyl Acrylate | Aluminum diisopropoxide Acetoacetic Ester Chelate |
|---|---|---|---|---|---|---|---|---|---|---|---|---|---|
| 32 | 55 | 10 | 15 | 15 |   |   |   |   | 15 |   |   |   | 0.3 |
| 33 | 55 | 10 |   |   |   |   |   |   | 15 |   |   |   | 0.3 |
| 34 | 60 | 10 |   | 13 |   |   |   |   | 12 |   |   |   | 0.3 |
| 35 | 60 | 10 |   | 25 |   |   |   |   |   |   |   |   | 0.3 |
| 36 | 60 | 10 |   | 10 |   |   |   |   | 5 | 10 |   |   | 0.3 |
| 37 | 60 | 10 |   | 10 |   |   |   |   | 10 |   |   | 5 | 0.3 |
| 38 | 60 | 10 | 15 |   |   |   |   |   |   | 10 |   |   | 0.3 |
| 39 | 60 | 10 |   | 15 |   |   |   |   |   | 10 |   |   | 0.3 |
| 40 | 60 | 10 |   | 15 |   |   |   |   |   |   | 15 |   | 0.3 |
| 41 | 55 | 10 |   | 15 |   |   |   |   |   |   | 15 |   | 0.3 |
| 42 | 55 | 10 |   | 15 |   |   |   |   |   | 15 |   |   | 0.3 |
| 43 | 55 | 10 |   |   | 5 |   |   |   | 15 |   |   |   | 0.35 |
| 44 | 55 | 10 |   |   | 5 |   |   |   |   |   | 15 |   | 0.35 |
| 45 | 55 | 10 |   |   |   | 15 |   |   | 15 |   |   |   | 0.35 |
| 46 | 55 | 10 |   |   |   | 15 |   |   |   |   | 15 |   | 0.35 |
| 47 | 55 | 10 |   |   |   |   | 15 | 15 | 15 |   |   |   | 0.35 |
| 48 | 55 | 10 |   |   |   |   | 15 |   |   |   | 15 |   | 0.35 |

EXAMPLE 49

The following crosslinking pressure sensitive composition illustrates the use of a zinc chelate for increasing the cohesive strength of the uncured film:

Pressure sensitive polymer of Example I: 60
Hypalon 30: 10
Trimethylolpropane triacrylate: 25
Methacrylic acid: 5
α,α-Dimethylbenzyl hydroperoxide: 1
2,6-di-t-butyl-4-methylphenol: 0.4
i-Propyl alcohol: 9.3
2,4-Pentanedione: 0.98
Zinc acetylacetonate: 0.2

Films were produced which were characterized by hold values at 150° C. in excess of 2 hours and peel values greater than 11 pli.

EXAMPLE 50

This example illustrates the use of butyl acrylate/vinyl acetate/acrylic acid (70/25/5) pressures sensitive polymer for the preparation of the crosslinking pressure sensitive films of this invention.

(A) A butyl acrylate/vinyl acetate/acrylic acid copolymer was prepared by conventional free radical polymerization and characterized by a Williams plasticity number of 3.12. A crosslinking pressure sensitive film was prepared of the following composition.

Pressure sensitive polymer: 55
Hypalon 30: 10
Trimethylolpropane triacrylate: 30
Methacrylic acid: 5

(B) This example further illustrates the use of the butyl acrylate/vinyl acetate/acrylic acid pressure sensitive polymer and a free radical generator.

Pressure sensitive polymer: 55
Hypalon 30: 10
Trimethylolpropane triacrylate: 30
Methacrylic acid: 5
Cumene hydroperoxide: 0.5

In both cases films were produced which were characterized by hold values at 150° C. in excess of 2 hours and peel values greater than 11 pli.

EXAMPLE 51

Similar improvements in the structural properties of pressure sensitive adhesives can be achieved using, as a base polymer, any acrylate pressure sensitive polymer including mixtures according to Table III all of which were polymerized to a plasticity number within the range of 2.1 to 2.5.

TABLE III

| Component | A | B | C | D | E |
|---|---|---|---|---|---|
| Ethyl acrylate | 3 |   |   |   | 10 |
| 2-Ethylhexyl acrylate | 65 |   | 50 | 70 | 60 |
| Butyl acrylate | 5 | 70 |   |   |   |
| Methyl acrylate |   | 25 |   | 9 | 27 |
| Vinyl acetate | 21 |   | 45 | 20 |   |
| Acrylic acid | 6 |   | 5 |   |   |
| Methacrylic acid |   | 5 |   | 1 |   |
| 2-Hydroxyethyl acrylate |   |   |   |   | 8 |

Although specific examples of the invention have been set forth hereinabove, it is not intended that the invention be limited solely thereto, but to include all the variations and modifications within the scope of the appended claims.

We claim:

1. An improved pressure sensitive adhesive composition comprising
   (i) an adhesive base component comprising
      (A) from 50 to 85% by weight of an acrylate based pressure sensitive adhesive polymer,
      (B) from 4 to 24% by weight of a chlorosulfonated polyethylene, and
      (C) from 11 to 40% by weight of a polymerizable low molecular weight vinyl monomer or polymerizable unsaturated oligomer or mixtures thereof; and
   (ii) an initiator comprising a condensation reaction product of a primary or secondary amine and an aldehyde to effect curing of the adhesive base component.

2. The pressure sensitive adhesive composition of claim 1 wherein the acrylate pressure sensitive polymer comprises at least about 30% of at least one comonomer selected from the group consisting of the C$_4$–C$_{10}$ alkyl esters of acrylic acid.

3. The pressure sensitive adhesive composition of claim 1 wherein the acrylate pressure sensitive polymer is selected from the group consisting of the interpolymers of 2-ethylhexylacrylate, octyl acrylate or butyl acrylate polymerized with vinyl acetate and acrylic acid wherein the acrylate ester constitutes at least 60% of the polymer.

4. The pressure sensitive adhesive composition of claim 1 wherein the chlorosulfonated polyethylene component contains from about 25 to 70 weight percent chlorine and about 3 to 160 millimoles sulfonyl chloride moiety per 100 grams polymer and the polyethylene from which the polymer is prepared has a melt index of about 4–500.

5. The pressure sensitive adhesive composition of claim 1 wherein the low molecular weight vinyl monomer is selected from the group consisting of
   (i) acrylic and methacrylic acid,
   (ii) hydroxyalkyl esters of acrylic and methacrylic acid,
   (iii) glycidyl esters of acrylic and methacrylic acid,
   (iv) ethylene glycol and polyethylene glycol diesters of acrylic and methacrylic acid,
   (v) polyhydric alcohol esters of acrylic and methacrylic acid.
   (vi) non-gem alkanediol esters of acrylic and methacrylic acid,
   (vii) the alkyl and alkyl substituted alkyl acrylates and methacrylates wherein the alkyl groups contain from 2 to 20 carbon atoms,
   (viii) the cycloalkyl esters of acrylic and methacrylic acids, and
   (ix) trimethylolpropane triacrylate and trimethylolpropane trimethacrylate.

6. The pressure sensitive adhesive composition of claim 1 wherein the curable unsaturated oligomer is selected from the group consisting of unsaturated urethanes, unsaturated expoxides, unsaturated polyesters and vinyl terminated elastomers.

7. The pressure sensitive adhesive composition of claim 6 wherein the unsaturated epoxide is a reaction product of acrylic or methacrylic acid with a polyfunctional epoxy compound containing at least two epoxy groups per molecule and having a molecular weight of 200 to 1500.

8. The pressure sensitive adhesive composition of claim 1 wherein the amine aldehyde component is formed from the condensation reaction of butyraldehyde and aniline or butyraldehyde and butyl amine.

9. The pressure sensitive adhesive composition of claim 1 wherein there is additionally present in the adhesive component (i) from 0.05 to 2.5% by weight of a free radical generator.

10. An improved pressure sensitive adhesive composition comprising
    (i) an adhesive base component comprising
      (A) from 50 to 85% by weight of an acrylate based pressure sensitive adhesive polymer,
      (B) from 4 to 24% by weight of a chlorosulfonated polyethylene, and
      (C) from 11 to 40% by weight of a polymerizable low molecular weight vinyl monomer or polymerizable unsaturated oligomer or mixtures thereof,
      (D) from 0.1 to 0.6% by weight of a chelated metal; and
    (ii) an initiator comprising a condensation reaction product of a primary or secondary amine and an aldehyde to effect curing of the adhesive base component.

11. The pressure sensitive adhesive composition of claim 10 wherein the chelated metal is selected from the group consisting of aluminum di-isopropoxide acetoacetic ester chelate, aluminum triacetylacetonate chelate, aluminum disecondary butoxide acetoacetic ester chelate, titanium di-isopropoxide diacetylacetonate ester chelate and zinc acetylacetonate ester chelate.

12. An improved pressure sensitive adhesive composition comprising:
    (i) an adhesive base component comprising
      (A) from 50 to 85% by weight of an acrylate based pressure sensitive adhesive polymer,
      (B) from 4 to 24% by weight of a chlorosulfonated polyethylene,
      (C) from 11 to 40% of a combination of:
        (1) at least one low molecular weight multifunctional vinyl monomer,
        (2) at least one unsaturated oligomer and
        (3) at least one copolymerizable carboxylic acid;
    (ii) an initiator comprising a condensation reaction product of a primary or secondary amine and an aldehyde to effect curing of the adhesive base component.

13. An improved pressure sensitive adhesive composition comprising:
    (i) an adhesive base component comprising
      (A) from 50 to 85% by weight of an acrylate based pressure sensitive adhesive polymer,
      (B) from 4 to 24% by weight of a chlorosulfonated polyethylene,
      (C) from 11 to 40% of a combination of:
        (1) at least one low molecular weight multifunctional vinyl monomer,
        (2) at least one unsaturated oligomer and
        (3) at least one copolymerizable carboxylic acid,
      (D) from 0.1 to 0.6% by weight of a chelated metal; and
    (ii) an initiator comprising a condensation reaction product of a primary or secondary amine and an aldehyde to effect curing of the adhesive base component.

14. A pressure sensitive adhesive coated article comprising a backing member having thereon a layer of the adhesive composition of claim 1.

15. A pressure sensitive adhesive coated article comprising a backing member having thereon a layer of the adhesive composition of claim 10.

16. A pressure sensitive adhesive coated article comprising a backing member having thereon a layer of the adhesive composition of claim 12.

17. A pressure sensitive adhesive coated article comprising a backing member having thereon a layer of the adhesive composition of claim 13.

18. A pressure sensitive film adhesive comprising a dried film of the adhesive composition of claim 1.

19. a pressure sensitive film adhesive comprising a dried film of the adhesive composition of claim 10.

20. A pressure sensitive film adhesive comprising a dried film of the adhesive composition of claim 12.

21. A pressure sensitive film adhesive comprising a dried film of the adhesive composition of claim 13.

* * * * *